United States Patent [19]

Gabano

[11] 4,069,373
[45] Jan. 17, 1978

[54] POSITIVE ACTIVE MATERIAL FOR PRIMARY BATTERIES HAVING HIGH ENERGY DENSITY

[75] Inventor: Jean-Paul Gabano, Poitiers, France

[73] Assignee: Saft-Societe des Accumulateurs Fixes et de Traction, Romainville, France

[21] Appl. No.: 719,113

[22] Filed: Aug. 31, 1976

[30] Foreign Application Priority Data

Sept. 15, 1975 France .................................. 75 28230

[51] Int. Cl.² .............................................. H01M 6/14
[52] U.S. Cl. .................................... 429/194; 429/217; 429/219
[58] Field of Search ........................ 429/194, 217, 219

[56] References Cited

U.S. PATENT DOCUMENTS

| | | | |
|---|---|---|---|
| 3,730,771 | 5/1973 | Tannenberger et al. ............. | 429/194 |
| 3,736,184 | 5/1973 | Dey et al. ............................ | 429/194 |
| 3,853,627 | 12/1974 | Lehmann et al. ................ | 429/194 X |
| 3,935,025 | 1/1976 | Cadman et al. .................. | 429/194 X |

*Primary Examiner*—Charles F. LeFevour
*Attorney, Agent, or Firm*—Kenyon & Kenyon, Reilly, Carr & Chapin

[57] ABSTRACT

The invention relates to a positive active material for primary batteries having high energy density and constituted by a metal salt whose cation is monovalent silver and whose complex anion is composed of a central atom and ligands, for example a ferrocyanide or a ferricyanide. According to the invention, the ligands are at least partly constituted by monovalent anions. Application is to lithium primary batteries of the so-called button type or other conventional constructions useful particularly as energy sources for watches or heart stimulators or pacemakers wherein essential requirements are substantially uniform discharge voltage from inception of use to exhaustion and relatively long life.

10 Claims, 1 Drawing Figure

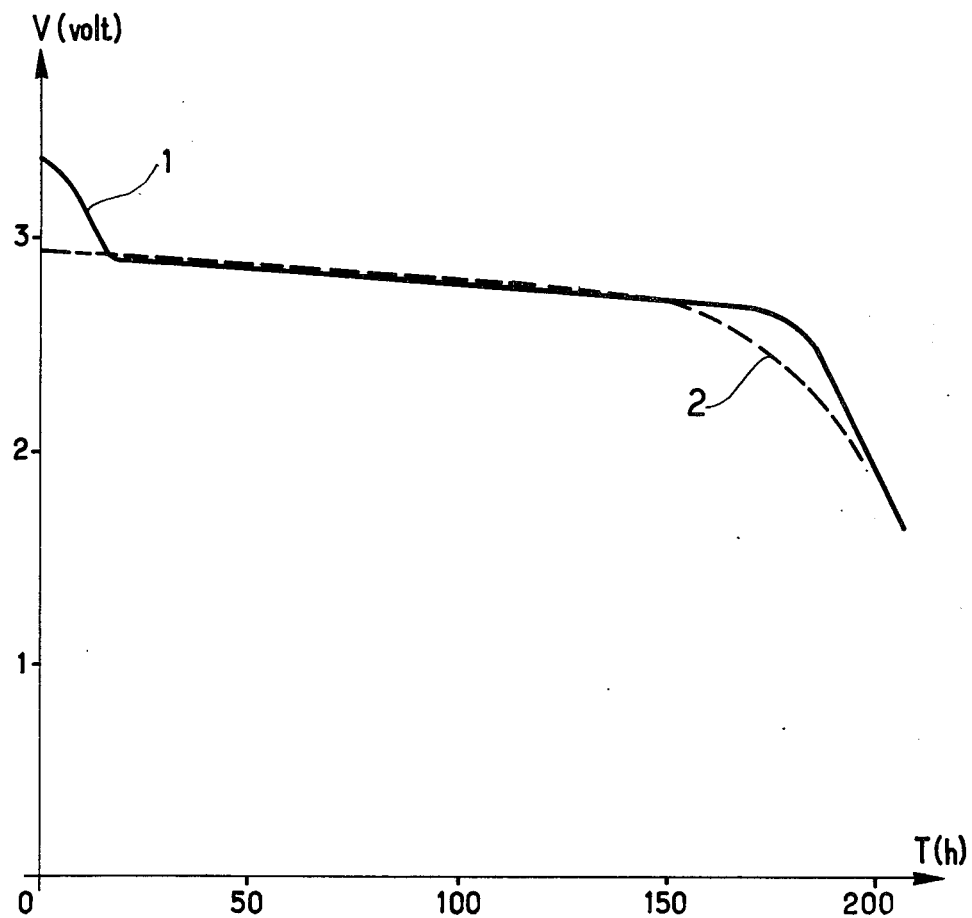

POSITIVE ACTIVE MATERIAL FOR PRIMARY BATTERIES HAVING HIGH ENERGY DENSITY

The present invention relates to positive materials for primary batteries having high energy density and more particularly to batteries having a lithium anode and an alectrolyte constituted by a solution in which the solvent is an aprotic compound, and to betteries containing such materials providing substantially uniform discharge voltage and long life rendering them useful as energy sources for watches, heart stimulators or pacemakers or other apparatus having these requirements.

Positive active materials constituted by oxygenated metal salts whose complex anion is highly coordinated by the oxygen as ligand are already known. The central atom of the anion can be metalloid (phosphorus, arsenic) or a metal (chromium, molybdenum, vanadium...) given as equivalents. Primary batteries e.g. as described in U.S. Pat. Nos. 3,853,627 and 3,658,592 whose positive active material is constituted by silver chromate have, in particular, produced discharges at low rate having a stability such that they could be used for applications such as watchmaking or heart stimulators (pacemakers). Although this active material has given satisfaction, substitute materials have been sought which could be used in the case of shortage of silver chromate, the preparation of which is fairly difficult.

Preferred embodiments of the present invention provide positive active materials having performances which are at least equal to those of the active materials constituted by salts in which the ligand of the anion is oxygen.

The present invention provides, in first aspect, a positive active material for primary batteries of high specific energy, the active material comprising a metal salt whose cation is monovalent silver and whose complex anion is a ferrocyanide or a ferricyanide.

The invention also provides, in second aspect, a primary battery having high energy density, whose negative electrode is constituted by lithium and whose electrolyte is a solution having as its solvent at least one aprotic compound, wherein the positive active material of the battery is the active material of the first aspect of the present invention. Principal application of batteries of this type are as energizing sources for watches and heart stimulators or pacemakers wherein substantial uniformity of discharge voltage and relatively long life are essential requisites. Such batteries may be of so called button type or have other conventional configuration and structure.

The invention will be better understood with reference to the described examples herebelow with reference to the accompanying drawing, in which a single figure shows the discharge curves of two primary batteries both according to the present invention.

1ST EXAMPLE

Primary batteries embodying the invention have been constituted taking lithium for the negative electrode and a molar solution of lithium perchlorate in an aprotic solvent such as propylene carbonate for the electrolyte.

The positive active material was constituted by silver ferricyanide, Fe $(CN)_6Ag_3$ and was mixed with a conductive diluent such as graphite to obtain acceptable conductivity and with a fluoronated polymer such as polytetrafluorethylene to act as a binding agent. The proportions by weight of this mixture were:

| | |
|---|---|
| Silver ferricyanide | 100 g |
| Graphite | 20 g |
| Fluorinated polymer | 20 g |

The proportion thus is about 5 parts by weight of the silver ferricyanide to 1 part each by weight of graphite and polymer.

A pellet of 2 g of this mixture was compressed on a silver collector made of expanded metal sheet, at a pressure of about 0.6 tons per square centimeter, the surface of a circular face being about 5 sq. cm. As this electrode operates on both faces, the active surface is 10 sq. cm. Two disks of lithium having a diameter of 3.2 cm and a thickness of at least 0.6 mm are disposed on opposite sides of the electrode, separator layers being inserted therebetween, two of these layers being made of a rag paper in contact with the cathode and two others of the layers being cotton fiber felts; the distance between the electrodes is 5 mm. The whole is immersed in the said electrolyte, in an appropriate sealed container.

The curve 1 in the single figure shows the discharge of the primary battery of this Example at a constant current of 0.1 mA per sq. cm., i.e. a total of 1 mA, the voltages V (volts) being shown along the ordinate, as a function of the discharge time T (hours) along the abscissa.

As is seen, the curve begins at 3.4 volts and decreases rapidly to become stabilized after about 18 hours at a level lying between 2.7 and 2.9 volts. This first part of the curve corresponds to the ferricyanide — ferrocyanide reduction, according to the reaction.

The discharge of the active material subsequently in the substantially flat portion corresponds to the discharge of the silver up to the valency 0, according to the reaction.

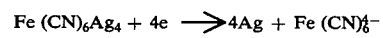

2ND EXAMPLE

This result is confirmed by the discharge of another series of primary batteries in which the silver ferricyanide has been replaced by silver ferrocyanide Fe $(CN)_6Ag_4$, in the same proportions, the other conditions remaining identical. The curve of the discharge of this second series of primary batteries is shown in the figure by the dashed line curve 2. As is seen, the discharge is substantially level from the very beginning of the curve, because of the prior preparation of silver ferrocyanide.

The use of silver ferrocyanide therefore seems preferable to that of ferricyanide if it is required to avoid initial over-voltage due to the reducing of the ferricyanide ion such as it exists in the first example.

Of course, the invention is not limited to the examples which have just been described. Variation within the scope of the claims in percentages of ingredients, dimensions, and use of other conductive diluents such as carbon black or silver, other appropriate aprotic solvents and electrolytes are possible and are contemplated. There is no intention of limitation to the exact disclosure hereinabove presented.

What is claimed is:

1. Primary batteries of high energy density useful as an energizing source for devices requiring substantial uniformity of discharge voltage throughout a relatively long life comprising a negative electrode constituted by lithium, an electrolyte solution comprising an organic solvent having dissolved therein an ion-forming salt and a positive electrode comprising positive active material constituted by a metal salt whose cation is monovalent silver and where complex anion is selected from the group consisting of silver ferrocyanide and silver ferricyanide.

2. Primary batteries according to claim 1, wherein said positive material comprises a mixture of said metal salt, a conductive diluent and a binding agent.

3. Primary batteries according to claim 2 wherein said mixture comprises proportionally by weight:
   100 g of said metal salt
   20 g of said conductive diluent
   20 g of said fluorinated polymer as binding agent.

4. Primary batteries according to claim 3 wherein said conductive diluent is graphite and said fluorinated polymer is polytetrafluorethylene.

5. Primary batteries according to claim 3 wherein a selected amount of said mixture is compressed into pellet form under a pressure of about 0.6 tons per sq. cm.

6. A primary battery of high energy density useful as the energizing source for devices requiring substantial uniformity of discharge voltage throughout a relatively long life, whose negative electrode is constituted by lithium and whose electrolyte is a solution comprising an organic solvent having dissolved therein an ion-forming salt and wherein its positive active material is selected from the group consisting of silver ferrocyanide and silver ferricyanide.

7. A primary battery according to claim 6, wherein the electrolyte is constituted by a solution of a lithium perchlorate in propylene carbonate.

8. A primary battery according to claim 6, wherein said positive active material is mixed with a conductive diluent and a binder and said mixture is compressed into pellet form.

9. A primary battery according to claim 8, wherein said conductive diluent is graphite and said binder is polytetrafluorethylene.

10. A primary battery according to claim 8 wherein said positive active material is mixed with conductive diluent and binder in the ratio of 5 parts of active material to 1 part each of binder and conductive diluent.

* * * * *